United States Patent Office 3,116,332

Patented Dec. 31, 1963

3,116,332

RESOLUTION OF RACEMIC AMINOISO-PROPANOL

Robert H. Sullivan, Woodbury, N.J., assignor to E. I. du Pont de Nemours and Company, Wilmington, Del., a corporation of Delaware No Drawing. Filed Oct. 17, 1958, Ser. No. 767,791
3 Claims. (Cl. 260—584)

The present invention relates to the resolution of racemic isopropanolamine into its optically active isomers. More particularly, the present invention relates to a process for the direct resolution of DL-isopropanolamine into its optical isomers, D(−)-isopropanolamine and L(+)-isopropanolamine.

Although the optical isomers of isopropanolamine have been known for a number of years, the only procedures for their preparation reported in the literature utilized as starting materials the optically active isomers of different compounds such as n-3-hydroxybutyric acid or 2-benzyloxpropionic acid which are converted to the desired isomer of isopropanolamine by multi-step procedures.

In an effort to resolve racemic isopropanolamine into its optical isomers directly, Clark and Jones (J. Am. Chem. Soc. 76, 3995 (1954)) attempted the resolution with various agents such as *d*-tartaric acid, N-carbobenzoxy-*d*-glutamic acid, *l*-malic acid, *l*-mandelic acid, and *d*-10-camphorsulfonic acid, but they found that none of these agents provided a direct means for separating the two isomers of isopropanolamine. The authors state, "No procedure for the resolution of DL-1-amino-2-propanol could be found in the literature. Although several salts of the amino-propanol were examined for possible direct resolution, none of them crystallized."

In U.S. 2,646,445 and the corresponding article in J. Am. Chem. Soc. cited above, a method is described for the resolution of racemic isopropanolamine by a sequence of steps comprising reacting racemic isopropanolamine with benzaldehyde and hydrogenating the resulting N-benzylidene-1-amino-2-propanol to form 1-benzylamino-2-propanol, reacting the benzylaminopropanol formed with a hydrohalic acid, acylating the hydrohalide formed by the reaction with the corresponding p-nitrobenzoylhalide to form the 2-(1-benzylaminopropyl)-p-nitrobenzoate hydrohalide which is then resolved by tartaric acid and converted to the individual isomers of isopropanolamine. Obviously, this procedure necessitates the use of expensive reagents and long reaction times, and only small yields of the desired isomers are obtained. Although there is a need for a direct method for the resolution of DL-isopropanolamine, there has been no satisfactory process for the resolution.

Accordingly, an object of the present invention is the resolution of DL-isopropanolamine. Another object of the present invention is to provide a direct method for obtaining the optical isomers from the racemic isopropanolamine. Other objects will be apparent from the following detailed description of the invention, and various advantages not specifically referred to herein will occur to those skilled in the art upon employment of the invention in practice.

I have found that the foregoing and related objects are achieved when I react racemic isopropanolamine with L(+)-tartaric acid in a suitable solvent and in the presence of at least two moles of water per mole of racemate; separate, at a temperature below the melting point of L(+)-isopropanolamine hydrogen L(+)-tartrate dihydrate, the L(+)-tartrate dihydrates thus formed by utilizing their differences in solubilities; and convert said tartrates separately to the corresponding L(+) and D(−) isomers of isopropanolamines by reaction with an alkaline earth hydroxide; remove the insoluble alkaline earth tartrate; and recover the optically active isopropanolamines from solution.

The following examples illustrate specific embodiments of the method of carrying out the present invention. It should be understood, however, that they are illustrative only and are not to be taken as limiting the invention in any way. The parts, when given, refer to parts by weight.

*Example 1*

In 200 parts of water were dissolved 75 parts of racemic isopropanolamine and 150 parts of L(+)-tartaric acid while the temperature was maintained below 50° C. The solution was then concentrated in vacuo at 40° C. until a crop of crystals appeared, and these crystals were collected. The crystals thus isolated from the reaction product mixture were washed with methanol to remove impurities. Upon analysis, the crystals were found to be L(+)-isopropanolamine hydrogen L(+)-tartrate dihydrate, M.P. 63–64° C., $[\alpha]_D^{28}=+27.7°$ (c. 5 in water).

*Example 2*

In 918 parts of water were dissolved 353 parts of racemic isopropanolamine and 706 parts of L(+)- tartaric acid. The temperature of the solution was maintained below 50° C. while the solution was seeded with a few crystals of L(+)-isopropanolamine hydrogen L(+)-tartrate dihydrate obtained by the procedure described in Example 1. The crystalline product was separated from the mother liquor and was recrystallized from 95% ethanol. The yield was 375 parts of L(+)-isopropanolamine hydrogen L(+) - tartrate dihydrate (71% yield), M.P. 61–63° C.

Calcium hydroxide was added to an aqueous solution of the L(+)-isopropanolamine hydrogen L(+)-tartrate dihydrate until a pH of 10.6 was attained. The resulting calcium tartrate was removed by filtration, and the amine and the water were separated by distillation of the filtrate at 25 mm. Hg. The material distilling at 70–75° C. was L(+)-isopropanolamine, $[\alpha]_D^{25}=+16.75°$, 65.7% resolution.

The D(−)-isopropanolamine is recovered after removal of substantially all of the L(+)-isopropanolamine hydrogen L(+)-tartrate dihydrate from the mother liquor by adding calcium hydroxide to the mother liquor, removing the resulting precipitate of calcium tartrate by filtration, and distilling the free D(−)-isopropanolamine from the reaction mixture. Alternatively, the D(−)-isopropanolamine hydrogen L(+)-tartrate dihydrate may be recovered by extracting the mother liquor with a selective solvent for D(−)-isopropanolamine hydrogen L(+)-tartrate dihydrate and isolating crystalline D(−)-isopropanolamine hydrogen L(+)-tartrate dihydrate by evaporating off said solvent.

Although L(+)-tartaric acid was exemplified as the resolution agent, D(—)-tartaric acid may also be used. If the D(—) isomer is used, D(—)-isopropanolamine hydrogen, D(—)-tartrate dihydrate and L(+)-isopropanolamine hydrogen D(—)-tartrate dihydrate are formed and are separated by methods similar to those described for the L(+) isomer, i.e., by utilizing differences in their solubilities in the reaction medium.

The presence of at least two moles of water per mole of racemate is critical to crystallization of the diasterioisomers of isopropanolamine hydrogen tartrate dihydrate. If less than two moles of water is present per mole of racemate, no crysals are formed, even on evaporation to dryness. Other solvents, e.g., ethanol and methanol, may also be used in conjunction with the water. Naturally, specific methods for recovering the reaction products depend on the solvent used.

In preferred embodiments of the invention approximately equimolar amounts of the amino alcohol and tartaric acid are used. However, satisfactory results may be obtained by using a slight excess of either reactant. If desired, the resolution may be effected by substituting one-half mole of hydrochloric acid for one-half mole of the tartaric acid. This procedure increases the difference in solubility of the diasterioisomeric tartrates and facilitates more convenient and better separations.

The reaction of racemic isopropanolamine with the optically active isomer of tartaric acid proceeds most favorably at temperatures below the boiling point of the solvent. Most desirably the reaction is carried out at temperatures below 50° C. The reaction of the tartaric acid and isopropanolamine is exothermic; therefore, the reaction temperature is maintained at the desired level by slowly adding the reactants to the solvent so that the heat evolved is slowly taken up in the reaction mixture before the addition of more reactants. Alternatively, the temperature may be maintained at below 50° C. by applying external cooling to the vessel in which the reaction is carried out.

The crystallization is effected at temperatures below the melting point of the product.

As illustrated, the L(+)-isopropanolamine hydrogen L(+)-tartrate dihydrate is recovered from the reaction medium by concentration, in vacuo, of the reaction mixture until crystals appear, or by seeding the reaction product solution with crystals of the desired compound to initiate precipitation of the crystals. I have also found that crystallization will occur spontaneously in concentrated solutions. The L(+)-isopropanolamine hydrogen L(+)-tartrate dihydrate crystallizes first since it is less soluble in the reaction medium than is the D(—) isomer. After the L(+)-isopropanolamine hydrogen L(+)-tartrate dihydrate is removed from the reaction product solution, the remaining solution may be racemized and the racemate resolved again as previously described to obtain more L(+)-isopropanolamine hydrogen L(+)-tartrate dihydrate.

If desired, the crystals of the L(+)-isopropanolamine hydrogen L(+)-tartrate dihydrate may be purified by washing with ethanol or another solvent in which the desired crystals are not appreciably soluble or by recrystallization prior to their decomposition to give the free stereoisomeric isopropanolamine.

The crystals are then dissolved in water and an alkaline earth metal hydroxide, e.g., calcium hydroxide, is added to precipitate an insoluble salt of the tartaric acid. The insoluble tartrate is removed by filtration, and the L(+)-isopropanolamine and water are separated by distillation or evaporation of the filtrate.

Since the tartrate is not racemized in the propanolamine resolution process, the optically-active tartaric acid may be recovered from the calcium tartrate precipitate and reused in a subsequent resolution step, thus reducing the cost of operation. The tartaric acid is recovered, for instance, by reacting the calcium tartrate with a mineral acid in the presence of a suitable solvent to form tartaric acid in solution and an insoluble salt of calcium, removing the precipitated calcium salt by filtration, and using the filtrate containing optically active L(+)-tartaric acid as the resolving agent. The tartaric acid need not be isolated from solution.

The invention has been described in detail in the foregoing. Obviously, modifications and variations of the present invention are possible without departure from the scope of the invention. I intend, therefore, to be limited only by the following claims.

I claim:

1. A method for the resolution of racemic isopropanolamine which comprises reacting L(+)-tartaric acid with the racemic isopropanolamine and water in an aqueous solution containing at least two moles of water per mole of racemate at a temperature below the boiling point of said solution, crystallizing L(+)-isopropanolamine hydrogen L(+)-tartrate dihydrate from the resulting aqueous solution of the diastereoisomers of isopropanolamine hydrogen tartrate dihydrate, said aqueous solution during said crystallization being at a temperature below the melting point of and supersaturated with respect to said L(+)-isopropanolamine hydrogen L(+)-tartrate dihydrate, and reacting said L(+)-isopropanolamine hydrogen L(+)-tartrate dihydrate with an alkaline earth hydroxide to yield L(+)-isopropanolamine.

2. A method for the resolution of racemic ispropanolamine which comprises reacting L(+)-tartaric acid with the racemic isopropanolamine and water in an aqueous solution containing at least two moles of water per mole of racemate at a temperature below the boiling point of said solution, seeding the resulting aqueous solution of the diastereoisomers of isopropanolamine hydrogen tartrate dihydrate with crystals of L(+)-isopropanolamine hydrogen L(+)-tartrate dihydrate to cause crystallization of L(+)-isopropanolamine hydrogen L(+)-tartrate dihydrate from said resulting aqueous solution, said resulting aqueous solution during said crystallization being at a temperature below about 50° C. and supersaturated with respect to said L(+)-isopropanolamine hydrogen L(+)-tartrate dihydrate, reacting an aqueous solution of the resulting L(+)-isopropanolamine hydrogen L(+)-tartrate dihydrate with an alkaline earth hydroxide to precipitate insoluble alkaline earth tartrate and recovering the resulting L(+)-isopropanolamine from the resulting solution.

3. A process of claim 2 wherein the alkaline earth hydroxide is calcium hydroxide.

References Cited in the file of this patent

UNITED STATES PATENTS 2,646,445 Clark ---------------- July 21, 1953